United States Patent
Wong et al.

(10) Patent No.: US 10,069,583 B2
(45) Date of Patent: *Sep. 4, 2018

(54) FASTER SYNCHRONIZATION TIME AND BETTER MASTER SELECTION BASED ON DYNAMIC ACCURACY INFORMATION IN A NETWORK OF IEEE 1588 CLOCKS

(71) Applicant: ALCATEL-LUCENT, Boulogne-Billancourt (FR)

(72) Inventors: Kin-Yee Wong, Ottawa (CA); Ian Leighton, Ottawa (CA); Peter Roberts, Ottawa (CA)

(73) Assignee: ALCATEL-LUCENT, Boulogne-Billancourt (FR)

(*) Notice: Subject to any disclaimer, the term of this patent is extended or adjusted under 35 U.S.C. 154(b) by 7 days.

This patent is subject to a terminal disclaimer.

(21) Appl. No.: 15/366,448

(22) Filed: Dec. 1, 2016

(65) Prior Publication Data

US 2017/0085330 A1    Mar. 23, 2017

Related U.S. Application Data

(63) Continuation of application No. 14/674,012, filed on Mar. 31, 2015, now Pat. No. 9,531,530.

(51) Int. Cl.
*H04J 3/06* (2006.01)
*H04L 7/10* (2006.01)

(52) U.S. Cl.
CPC .......... *H04J 3/0641* (2013.01); *H04J 3/0667* (2013.01); *H04J 3/0685* (2013.01); *H04L 7/10* (2013.01)

(58) Field of Classification Search
CPC ........ H04L 7/04; H04L 7/0008; H04J 3/0685; H04J 3/0658
See application file for complete search history.

(56) References Cited

U.S. PATENT DOCUMENTS

2011/0158120 A1* 6/2011 Hamasaki ............. H04J 3/0641
                                                        370/252
2011/0200051 A1   8/2011 Rivaud
(Continued)

FOREIGN PATENT DOCUMENTS

WO        2013189536          6/2012

OTHER PUBLICATIONS

Mark Grayson, Kevin Shatzkamer and Scott Wainner, "IP Design for Mobile Networks", Chapter 7, Cisco, Jun. 2009.*
(Continued)

*Primary Examiner* — Aristocratis Fotakis
(74) *Attorney, Agent, or Firm* — Kramer Amado, P.C.

(57) ABSTRACT

A method and system are provided for synchronizing local clocks more quickly in a telecommunication network using IEEE 1588. A network element that receives timing signals from one or more possible parent clocks considers a measure of the reliability of the timing signals contained in Announce messages from the parent clock or clocks. The clock uses this reliability information in selecting one of the possible parent clock or clocks to use as the actual parent clock. Once the selection is made, the clock adjusts the filtering characteristics applied to timing signals received from the selected parent clock. The adjustments reflect how confident the parent clock is as to how stable the timing information it provides has become. If the indication of reliability contained in Announce messages received from the parent clock indicates that the timing information is not very reliable, then a high filter bandwidth is used in filtering the timing signals. If the indication of reliability contained in Announce messages indicates that the timing information is reliable, such as by crossing a threshold, then the clock shifts to a normal low bandwidth filtering. By using reliability information in the Announce messages, clocks can better make (Continued)

selections as to which parent clock to use, and can use the reliability information to more quickly synchronize themselves with a grandmaster clock.

4 Claims, 3 Drawing Sheets

(56) References Cited

U.S. PATENT DOCUMENTS

| | | | |
|---|---|---|---|
| 2012/0026041 A1* | 2/2012 | Murdock | G01S 5/0289 |
| | | | 342/387 |
| 2013/0034197 A1 | 2/2013 | Aweya | |
| 2013/0103997 A1* | 4/2013 | Song | G01R 31/31727 |
| | | | 714/731 |
| 2013/0308658 A1 | 11/2013 | Le Pallec et al. | |
| 2014/0068315 A1 | 3/2014 | Aweya et al. | |
| 2014/0185632 A1* | 7/2014 | Steiner | H04J 3/0641 |
| | | | 370/503 |
| 2015/0071309 A1 | 3/2015 | Aweya et al. | |
| 2015/0134764 A1* | 5/2015 | Noebauer | H04J 3/0667 |
| | | | 709/208 |
| 2015/0222276 A1 | 8/2015 | Milijevic | |
| 2015/0222413 A1 | 8/2015 | Pietilainen | |
| 2016/0013876 A1 | 1/2016 | Zhang | |
| 2016/0094335 A1 | 3/2016 | Roberts | |
| 2016/0112185 A1 | 4/2016 | Yin | |
| 2016/0156427 A1 | 6/2016 | Yang | |
| 2017/0359137 A1* | 12/2017 | Butterworth | H04J 3/067 |

OTHER PUBLICATIONS

Watt, "Understanding and Applying Precision Time Protocol Schweitzer Engineering Laboratories, Power and Energy Automation Coference", Mar. 2014.

* cited by examiner

FASTER SYNCHRONIZATION TIME AND BETTER MASTER SELECTION BASED ON DYNAMIC ACCURACY INFORMATION IN A NETWORK OF IEEE 1588 CLOCKS

RELATED APPLICATIONS

This application is a continuation of U.S. patent application Ser. No. 14/674,012, filed on Mar. 31, 2015, the entire disclosure of which is hereby incorporated herein by reference.

FIELD OF INVENTION

This invention relates to timing signals within nodes of a telecommunication network, and more particularly to both the selection of a master clock in an IEEE 1588 network and faster synchronization times.

BACKGROUND

In a telecommunications network employing the IEEE 1588 standard, a common time is distributed throughout the network so that network elements within the network are synchronized. According to IEEE 1588-2008, a grandmaster clock on a network element transmits timing information to a clock on another network element using PTP (Precision Time Protocol) messages, typically conveying such information to the boundary on the order of several times a second. When the clock receives timing information, the clock corrects its own local clock with an offset derived from the time stamps in the various PTP messages used to convey the timing information. If the clock acts as a boundary clock, it then transmits its own timing information to other network elements, including possibly other boundary clocks. A clock that only receives timing information and does not convey it onward using IEEE 1588 is a slave clock. The clock delivering timing information to a second clock is referred to as the parent clock of the second clock. On any of these clocks, a port that receives timing information from another clock is referred to as a slave port, and a port that transmits timing information to another clock is referred to as a master port.

A boundary clock or slave clock may receive supervisory information from more than one clock. In such a case the boundary clock or slave clock selects one of these clocks as its parent clock by using a Best Master Clock Algorithm. The boundary or slave clock then uses timing information received from the parent clock to adjust its local clock.

The accuracy, stability, and quality of a clock (referred to herein collectively as the "clock quality") are included in Announce messages sent from a clock to its slave clock or clocks. When selecting a parent clock to be the "best master clock", a clock may take into account the clock quality indicated by the possible parent clocks. However the reliability of a parent clock is not taken into account by the clock when selecting amongst parent clocks. The reliability of a parent clock may vary over time. For example a boundary clock that has recently booted up takes a measurable amount of time to synchronize its own clock with that of its grandmaster clock. The Pip messages transmitted by the boundary clock may therefore not accurately reflect the timing signals emanating from the grandmaster clock. The boundary clock may therefore initially introduce errors into the timing information. A clock takes into account the timing information received from its various upstream clocks when selecting one of these clocks to be the parent clock. The clock does not into account, however, the level of reliability of the respective timing information.

The clock also does not adjust its filtering characteristics applied to timing signals received from its selected parent clock. This is because the level of reliability of the received timing information is not known. Low bandwidth filtering is used in order to accommodate high packet delay variation in the network. This can lead to slower and slower synchronization time as a chain of clocks increase in count in large networks.

There is a need to improve the selection of which clock to use as a parent clock, and to provide faster synchronization of local clocks to a grandmaster clock.

SUMMARY

According to one aspect, a method is provided for synchronizing a local clock in a telecommunication network which uses IEEE 1588 messages to convey timing information. The reliability of timing information of a selected parent clock is monitored, an indication of the reliability being contained in Announce messages received from the parent clock. The bandwidth of a filter used in filtering timing signals from the parent clock is adjusted using the reliability of timing information. The filter is applied to timing signals from the selected parent clock when synchronizing the local clock. In one embodiment, reliability of timing information of at least one possible parent clock is determined. One of the at least one possible parent clock is selected as the selected parent clock using at least the reliability of timing information of the at least one possible parent clock. In one embodiment, the bandwidth of the filter is adjusted by decreasing the bandwidth if it is determined that the indication of reliability indicates that the reliability has improved past a threshold, and by increasing the bandwidth if it is determined that the indication of reliability indicates that the reliability has worsened past a threshold.

According to another aspect, a method is provided of selecting a parent clock of a local clock in a telecommunication network which uses IEEE 1588 messages to convey timing information. Reliability of timing information of at least one possible parent clock is determined, an indication of the reliability being contained in Announce messages received from the respective possible parent clock. One of the at least one possible parent clock is selected as the selected parent clock using at least the reliability of timing information of the at least one possible parent clock. In one embodiment, the possible parent clock with the highest indication of reliability is selected if there is more than one possible parent clock and if the possible parent clocks indicate that their respective grandmaster clocks have the same clock quality.

The methods of embodiments of the invention may be stored as logical instructions on a non-transitory computer-readable storage medium in a form executable by a computer processor.

Embodiments of the invention allow a clock to take into account the reliability of the timing information provided by each potential parent clock when selecting which clock to use as a parent clock, the reliability of the timing information being a dynamic measure of the degree to which the parent clock is confident of its own timing information. This will depend typically on how much the parent clock is having to adjust itself to match its grandmaster clock. The reliability information provided by each available parent clock is cumulative of the reliability of all upstream clocks. Embodiments of the invention also allow a clock to adjust its filtering characteristics by taking into account the reliability indication provided by a selected best master clock, a lower filter bandwidth (resulting in faster convergence) being used if the best master clock indicates that the timing information it is providing is very reliable and a higher filter bandwidth being used if the best master clock indicates that the timing information it is providing is not very reliable.

BRIEF DESCRIPTION OF THE DRAWINGS

The features and advantages of embodiments of the invention will become more apparent from the following detailed description of the preferred embodiment(s) with reference to the attached figures, wherein.

DETAILED DESCRIPTION OF THE PREFERRED EMBODIMENTS

Figure 1:
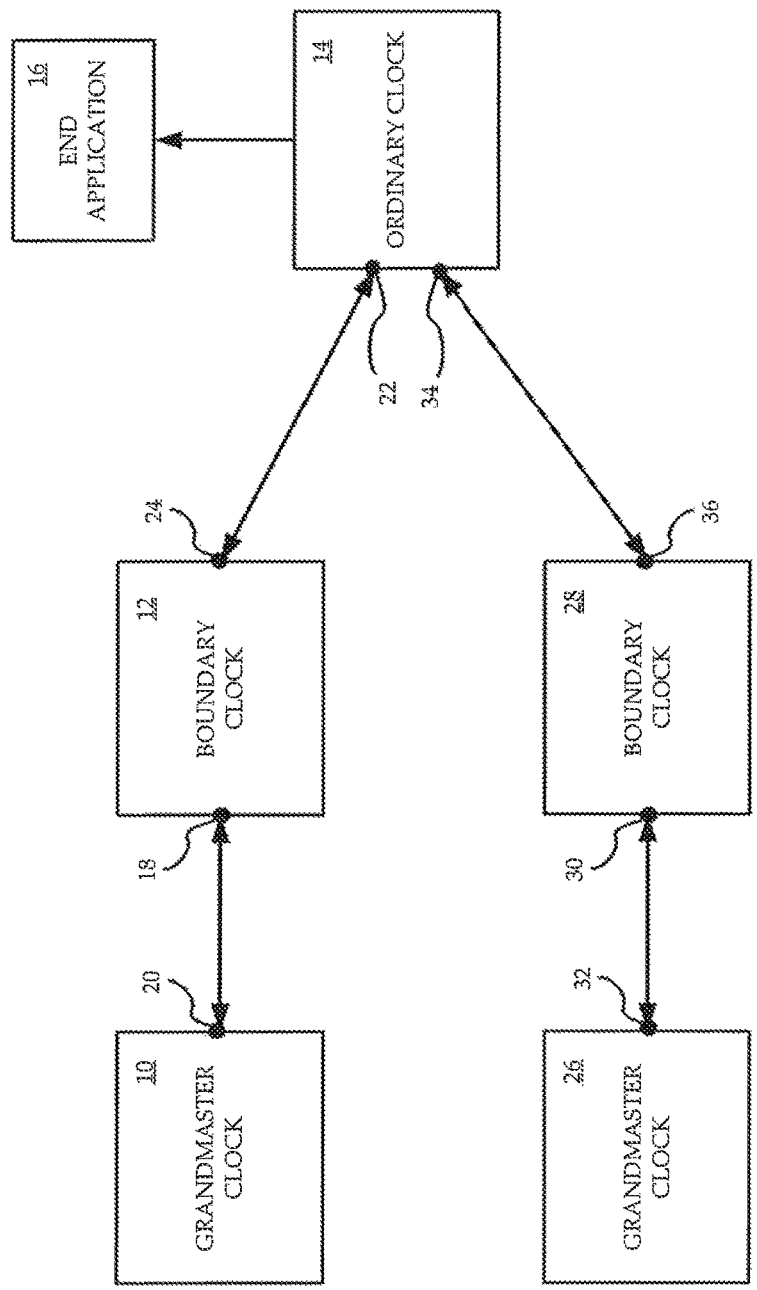
FIG. 1 is a block diagram of a portion of an example telecommunication network.

Referring to FIG. 1, a block diagram of a portion of a telecommunication network is shown. A first ordinary clock acts as a first grandmaster clock 10. The network element on which the first grandmaster clock 10 is located is confident of its clock because the network element is receiving reliable time information to which it can synchronize its local clock, such as by using a GPS receiver. The first grandmaster clock 10 exchanges Precision Time Protocol (PTP) messages with a first boundary clock 12 located on a separate network element. When the first boundary clock 12 receives the PTP timing information, the first boundary clock 12 selects clock 10 as its parent clock and starts synchronizing its local clock with that of the grandmaster clock 10. The first boundary clock 12 then transmits its timing information in PTP messages to a second ordinary clock 14 located on another network element. An end application 16 uses the second ordinary clock 14 as a source of timing information.

The first boundary clock 12 has a port 18 linked to a port 20 on the first grandmaster clock 10. The second ordinary clock 14 has a port 22 linked to a port 24 on the first boundary clock 12.

A third ordinary clock acts as a second grandmaster clock 26 within the network. The network element on which the second grandmaster clock 26 is located is confident of its clock because the network element is receiving reliable time information to which it can synchronize its local clock, such as by using a GPS receiver. The second grandmaster clock 26 exchanges PTP messages with a second boundary clock 28 located on a separate network element. The second boundary clock 28 exchanges PTP messages with the second ordinary clock 14. The first boundary clock 12 and the second boundary clock 28 are referred to herein as "intermediate clocks", because they lie on the network paths from the second ordinary clock 14 and the grandmaster clocks 10 and 26.

The second boundary clock 28 has a port 30 linked to a port 32 on the second grandmaster clock 26. The second ordinary clock 14 has a port 34 linked to a port 36 on the second boundary clock 28.

Boundary clocks 12 and 28 communicate with the second ordinary clock 14 using the same destination protocol address that is associated with the PTP port associated with the second ordinary clock 14.

The telecommunication network shown in FIG. 1 is chosen deliberately as a very simple network in order to best illustrate embodiments of the invention. More generally there may be more than one intermediate clock between either or both grandmaster clock 10 and 26 and the second ordinary clock 14. The second ordinary clock 14 may receive PTP messages from more than two intermediate clocks, and may receive timing information about more than two grandmaster clocks.

Broadly, a clock in a telecommunications network employing IEEE 1588 receives Announce messages from at least one possible parent clock. Reliability of timing information of the at least one possible parent clock is determined, an indication of the reliability being contained in the Announce messages received from the respective possible parent clock. One of the at least one possible parent clock is selected as the selected parent clock using at least the reliability of timing information of the at least one possible parent clock. The clock may also adjust its filter characteristics so as to more quickly synchronize its local clock with that of a grandmaster clock. The reliability of timing information of the selected parent clock is monitored. The bandwidth of a filter used in filtering timing signals from the selected parent clock is adjusted using the reliability of timing information.

Figure 2:
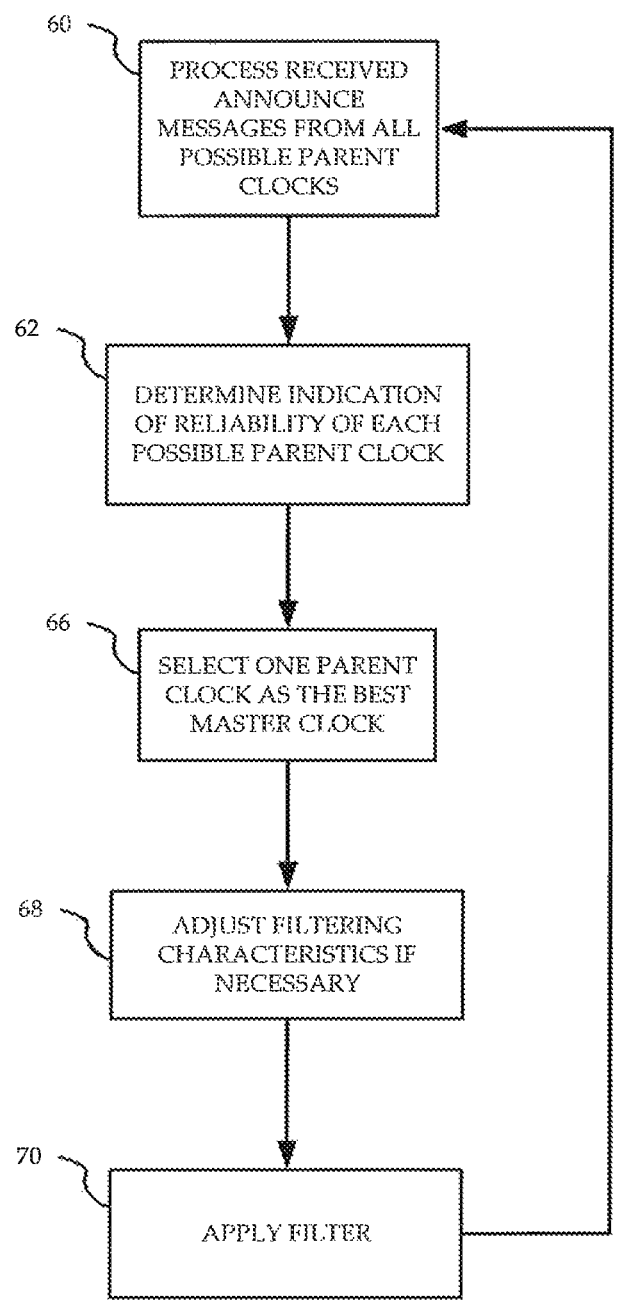
FIG. 2 is a flowchart of a method carried out by the second ordinary clock of FIG. 1 according to one embodiment of the invention.

Referring to FIG. 2, a flowchart of a method carried out by a clock 12, 14, 28 of FIG. 1 having at least one possible parent clock according to one embodiment of the invention is shown. The method is described with reference to the second ordinary clock 14 of FIG. 1 for simplicity. More generally, the method is carried out by any boundary clock or slave-only ordinary clock having one or more possible parent clocks. In the example network of FIG. 1, the method is carried out by the clocks 12, 14, and 28, although the selection of which parent clock to select is trivial in the case of boundary clocks 12 and 28 as the boundary clocks 12 and 28 have only one possible parent clock each. However the method is still carried out in order to dynamically adjust the filtering characteristics of the local clock, as described below. If a clock had more than one possible parent clock, as would be the case if the first boundary clock 12 received Announce messages from two grandmaster clocks, then the method would also allow selection of one these grandmaster clocks.

The method uses an indication of reliability contained in Announce messages received from possible parent clocks, as described in U.S. patent application Ser. No. 14/499,686 entitled "Distribution of Dynamic Accuracy Information in a Network of IEEE 1588 Clocks", filed Sep. 29, 2014 and incorporated by reference herein. Reliability is distinct from clock quality. Clock quality is a (generally) static measure of a grandmaster clock. In contrast, reliability of clocks along the path to the grandmaster clock is a quantity that can change over time. The reliability of timing information can change over time as devices along the path gradually synchronize their local clocks with that of the grandmaster clock. For example, this may be because the local clock of an intermediate clock gradually adjusts to synchronize with a grandmaster clock of which it has recently become aware. The clock quality information may indicate to a clock that the grandmaster clock to which an Announce message pertains is a very good clock, but the indication of reliability may indicate that the timing information is not yet very reliable. As time progresses, subsequent Announce messages pertaining to that clock will indicate the same clock quality, but the reliability of the timing information in the Announce message should improve as the parent clock and the clocks of all intermediate nodes between the parent clock and the grandmaster clock synchronize their local clocks with that of the grandmaster clock.

At step 60 the second ordinary clock 14 processes received Announce messages from all possible parent clocks (i.e. the first boundary clock 12 and the second boundary clock 28, in the network shown in FIG. 1). At step 62 the second ordinary clock 14 determines an indication of reliability of each possible parent clock. The second ordinary clock 14 does this by extracting the indication of reliability from Announce messages sent by the possible parent clock or clocks. The indication of the reliability in the Announce messages is as a TLV (type-length-value) element, the value of the TLV element indicating a degree of reliability of the timing information in the Announce messages. The indication of reliability reflects the cumulative reliability of the possible parent clock and all upstream clocks along the path from the possible parent clock to its grandmaster clock.

At step 66 the second ordinary clock 14 selects the possible parent clock using a modification of the Best Master Clock Algorithm (BMCA). The BMCA is a prescribed set of selection criteria for determining a parent clock. These selection criteria in the prescribed BMCA do not include the indication of reliability. The second ordinary clock 14 modifies the prescribed BMCA by taking into account additionally the indication(s) of reliability determined at step 62. For example, if the clock qualities of the two grandmaster clocks are the same, the highest indication of reliability could be used as the determining criterion for best master clock selection.

At step 68 the second ordinary clock 14 adjusts the filtering characteristics applied to timing signals received from the selected parent clock. If the indication of reliability of the selected parent clock is low, presumably because the selected parent clock or some other upstream intermediate clock still has not synchronized with the grandmaster clock or has recently restarted, then a high bandwidth filter is applied to timing signals received from the selected parent clock. If the indication of reliability of the selected parent clock is high, then a low bandwidth filter is applied to timing signals received from the selected parent clock. The bandwidth used in the filter can either have a continuous value range or an integer number of values. Thresholds may apply to determine which filtering is used based on path reliability. For example, a clock may use a filter bandwidth of 400 µHz when the network is providing high path reliability to the grandmaster clock (e.g. reliability better than +/−20 µs), and a filter bandwidth of 100 mHz when the network is providing poor path reliability to the grandmaster clock (e.g. reliability worse than +/−1 ms). At step 70, the filter is applied to timing signals from the selected parent clock when synchronizing the local clock.

In one embodiment, a higher filter bandwidth is used by the clock initially. If the indication of reliability contained in Announce messages received from the selected parent clock is such that the reliability of the timing information has improved past a threshold, then the clock adjusts its filter characteristics by reducing its filter bandwidth. If the indication of reliability contained in Announce messages received from the selected parent clock is such that the reliability of the timing information has worsened past the threshold, such as if the selected parent clock or some other clock between it and its grandmaster clock has recently restarted, then the clock adjusts its filter characteristics by increasing its filter bandwidth.

In another embodiment, a higher filter bandwidth is used by the clock initially. Each time the indication of reliability contained in Announce messages received from the selected parent clock is such that the reliability of the timing information has improved past one of a plurality of thresholds, the clock adjusts its filter characteristics by reducing its filter bandwidth. Each time the indication of reliability contained in Announce messages received from the selected parent clock is such that the reliability of the timing information has worsened past one of a plurality of thresholds, the clock adjusts its filter characteristics by increasing its filter bandwidth. The thresholds used in both cases may or may not be the same.

The second ordinary clock repeats the above steps 60, 62, 66, and 68 periodically. For example, these steps can be repeated every two seconds. As another example, these steps can be repeated whenever an Announce message is received.

The method has been described as both using indications of reliability to select a parent clock and to dynamically adjust the filtering characteristics of timing signals received from the selected parent clock. Alternatively either of these could be used alone and still provide advantages over existing methods.

The methods described above are preferably implemented as logical instructions in the form of software. Alternatively, the methods may be implemented as hardware, or as a combination of software or hardware. If in the form of software, the logic of the methods may be stored on a non-transitory computer-readable storage medium in a form executable by a computer processor. If in the form of hardware, the logic of the methods may be implemented by a general purpose processor, a network processor, a digital signal processor, an ASIC, a macroscopic circuit, or multiple such devices.

Figure 3:
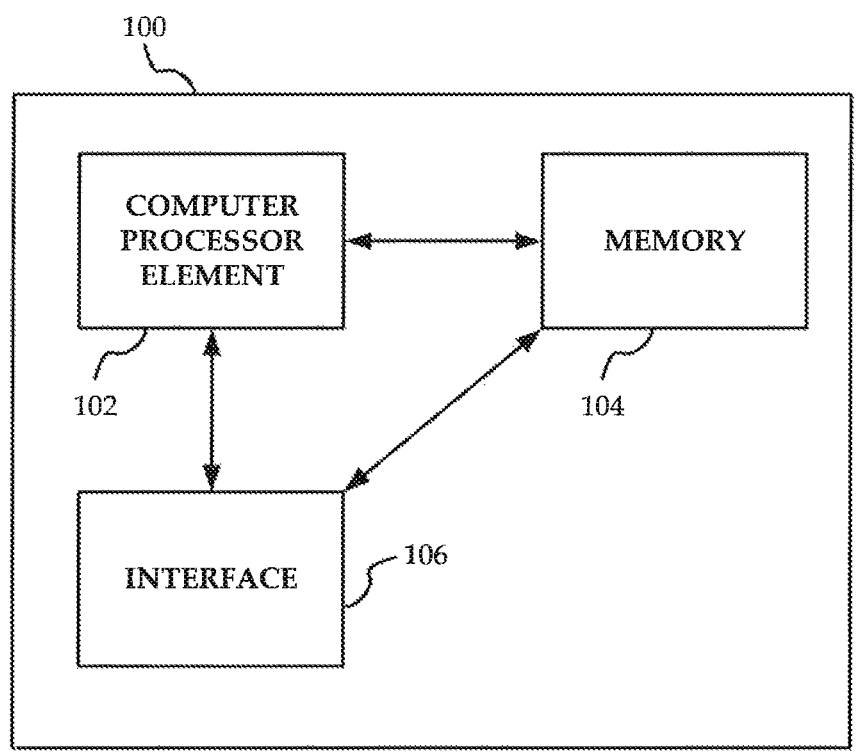
FIG. 3 is a block diagram of a computing environment according to one embodiment of the invention It is noted that in the attached figures, like features bear similar labels.

A simplified block diagram of one embodiment of each intermediate clock and each slave-only ordinary clock is shown in FIG. 3 as a processor assembly 100. The processor assembly 100 includes a computer processor element 102 (e.g. a central processing unit and/or other suitable processor(s)). The computer processor element 102 has access to a memory 104 (e.g. random access memory, read only memory, and the like). The processor element 102 and the memory 104 are also in communication with an interface comprising various I/O devices 106 (e.g. a user input device (such as a keyboard, a keypad, a mouse, and the like), a user output device (such as a display, a speaker, and the like), an input port, an output port, a receiver, a transmitter, and a storage device (such as a tape drive, a floppy drive, a hard disk, a compact disk drive, and the like)). In one embodiment, the methods described above are implemented as software instructions loaded into the memory 104 and causing the computer processor element 102 to execute the methods.

The embodiments presented are exemplary only and persons skilled in the art would appreciate that variations to the embodiments described above may be made without departing from the spirit of the invention. The scope of the invention is solely defined by the appended claims

What is claimed:
1. A method of selecting a parent clock of a local clock in a telecommunication network which uses IEEE 1588 messages to convey timing information, the method comprising:
determining reliability of timing information of at least one possible parent clock, an indication of the reliabil- ity of timing information contained in Announce messages received from the respective possible parent clock;

selecting one of the possible at least one parent clock using at least the reliability of timing information of the at least one possible parent clock, and adjusting a bandwidth of a filter by decreasing the bandwidth of the filter if it is determined that the indication of reliability indicates that the reliability has improved past a threshold and increasing the bandwidth of the filter if it is determined that the indication of reliability indicates that the reliability has worsened past the threshold.

2. The method of claim 1, wherein selecting one of the possible at least one parent clock selects the parent clock with a highest indication of reliability if there is more than one possible parent clock and if the possible parent clocks indicate that their respective grandmaster clocks have the same clock quality.

3. A method of selecting a parent clock of a local clock in a telecommunication network which uses IEEE 1588 messages to convey timing information, the method comprising:

determining reliability of timing information of at least one possible parent clock, an indication of the reliability of timing information contained in Announce messages received from the respective possible parent clock;

selecting one of the possible at least one parent clock using at least the reliability of timing information of the at least one possible parent clock, and adjusting a bandwidth of a filter by decreasing the bandwidth of the filter each time that it is determined that the indication of reliability indicates that the reliability has improved past one of a plurality of thresholds and increasing the bandwidth of the filter each time that it is determined that the indication of reliability indicates that the reliability has worsened past one of the plurality of thresholds.

4. The method of claim 3, wherein selecting one of the possible at least one parent clock selects the parent clock with a highest indication of reliability if there is more than one possible parent clock and if the possible parent clocks indicate that their respective grandmaster clocks have the same clock quality.

\* \* \* \* \*